(12) United States Patent
Wymore

(10) Patent No.: US 11,518,327 B2
(45) Date of Patent: Dec. 6, 2022

(54) VEHICLE BUMPER WITH SELECTIVELY DEPLOYABLE INTEGRATED LIGHT BAR

(71) Applicant: NAADE, Inc., Brea, CA (US)

(72) Inventor: Timothy J. Wymore, Yorba Linda, CA (US)

(73) Assignee: NAADE, INC., Brea, CA (US)

( * ) Notice: Subject to any disclaimer, the term of this patent is extended or adjusted under 35 U.S.C. 154(b) by 66 days.

(21) Appl. No.: 17/083,977

(22) Filed: Oct. 29, 2020

(65) Prior Publication Data

US 2021/0129783 A1    May 6, 2021

Related U.S. Application Data

(60) Provisional application No. 62/930,168, filed on Nov. 4, 2019.

(51) Int. Cl.
*B60R 19/50* (2006.01)

(52) U.S. Cl.
CPC ........ *B60R 19/50* (2013.01); *B60R 2019/505* (2013.01)

(58) Field of Classification Search
CPC ...... B60Q 1/0017; B60Q 1/04; B60Q 1/0408; B60Q 1/0491; B60Q 1/05; B60Q 1/0425; B60R 19/50; B60R 2019/505
USPC ......................................................... 293/117
See application file for complete search history.

(56) References Cited

U.S. PATENT DOCUMENTS

| | | | | |
|---|---|---|---|---|
| 2,119,892 A | * | 6/1938 | Snow | B60Q 1/05 280/847 |
| 3,071,684 A | * | 1/1963 | Ruth | B60Q 1/05 362/227 |
| 3,310,669 A | * | 3/1967 | Dils | B60Q 1/05 D26/29 |
| 3,526,764 A | * | 9/1970 | Bauer | B60Q 1/05 362/527 |
| 3,544,786 A | * | 12/1970 | Baker | B62D 25/105 362/502 |
| 3,735,114 A | * | 5/1973 | Porsche | B60Q 1/05 362/527 |
| 4,070,051 A | * | 1/1978 | Peter | B60Q 1/0491 293/134 |

(Continued)

FOREIGN PATENT DOCUMENTS

DE                   2813035 A  *  10/1978  ............... B60Q 1/05

*Primary Examiner* — Hilary L Gutman
(74) *Attorney, Agent, or Firm* — Stetina Brunda Garred and Brucker

(57) ABSTRACT

A bumper for a vehicle includes a main body having a central opening formed therein. A pivoting assembly is pivotally connected to the main body. The pivoting assembly includes a light bar having a body and a plurality of lights coupled to the body. The plurality of lights are configured to emit light along an emitting axis. The pivoting assembly additionally includes a cover plate coupled to the body of the light bar. The pivoting assembly is configured to transition between a closed position and an open position. In the closed position, the cover plate extends within the central opening and the light bar is positioned so that the emitting axis does not extend through the central opening. In the open position, the cover plate is spaced from the central opening and the light bar is position so that the emitting axis extends through the central opening.

20 Claims, 12 Drawing Sheets

SECTION B-B

(56) References Cited

U.S. PATENT DOCUMENTS

| | | | | |
|---|---|---|---|---|
| 4,246,628 A * | 1/1981 | Ikemizu | B60Q 1/05 74/42 |
| 4,270,787 A * | 6/1981 | Savell | B60Q 1/2626 293/121 |
| 4,282,561 A * | 8/1981 | Yano | B60Q 1/05 362/526 |
| 4,437,143 A * | 3/1984 | Hayashi | B60Q 1/05 362/372 |
| 4,507,711 A * | 3/1985 | Ono | B60S 1/603 15/250.31 |
| 4,516,191 A * | 5/1985 | Moriyama | B60Q 1/05 49/40 |
| 4,602,319 A * | 7/1986 | Moriyama | B60Q 1/05 362/527 |
| 4,630,179 A * | 12/1986 | Yukimoto | B60Q 1/05 362/269 |
| 4,707,014 A * | 11/1987 | Rich | B60Q 1/2611 296/180.1 |
| 4,768,134 A * | 8/1988 | Haydu | B60Q 1/05 362/285 |
| 4,785,382 A * | 11/1988 | Fukura | B60Q 1/05 362/527 |
| 4,796,164 A * | 1/1989 | Fukura | B60Q 1/05 362/546 |
| 4,821,155 A * | 4/1989 | Harting | B60Q 1/05 362/428 |
| 4,940,281 A * | 7/1990 | Komatsu | B60Q 1/05 296/193.09 |
| 4,943,895 A * | 7/1990 | Brandenburg | B60Q 1/05 362/233 |
| 5,311,411 A * | 5/1994 | Garolfi | B60Q 1/20 362/248 |
| 9,840,218 B1 | 12/2017 | Wymore | |
| D809,684 S | 2/2018 | Wymore | |
| D814,984 S | 4/2018 | Wymore | |
| 10,189,395 B2 | 1/2019 | Wymore | |
| D840,573 S | 2/2019 | Wymore | |
| 10,259,413 B2 | 4/2019 | Wymore | |
| 2017/0254509 A1* | 9/2017 | Oh | B60Q 1/24 |
| 2018/0037152 A1* | 2/2018 | Wymore | B60Q 1/0005 |
| 2018/0037161 A1 | 2/2018 | Wymore | |
| 2018/0056909 A1* | 3/2018 | Sedique | B60R 19/50 |
| 2019/0143922 A1* | 5/2019 | Chuptys | B60Q 1/26 293/117 |

* cited by examiner

SECTION A-A

SECTION B-B

VEHICLE BUMPER WITH SELECTIVELY DEPLOYABLE INTEGRATED LIGHT BAR

CROSS-REFERENCE TO RELATED APPLICATIONS

This application claims the benefit of U.S. Provisional Application No. 62/930,168, filed Nov. 4, 2019, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a vehicle bumper, and more specifically, to a vehicle bumper having a pivoting light that can be selectively deployed or stowed behind a cover plate.

2. Description of the Related Art

Vehicles typically include external lights to illuminate an area in front of the vehicle to provide the driver with a better view of what lies ahead. The external lights may illuminate obstacles, such as other vehicles, terrain, vegetation, animals, etc. Many vehicles include headlights for this purpose, with the headlights typically being permanently mounted on the vehicle for illuminating light in a specific direction. In many instances, the vehicle may include a pair of headlights positioned at a respective side of the vehicle. In addition to headlights, vehicles may include roof mounted light bars, which may supplement the light provided by the headlights.

Although conventional vehicle lights may provide a certain degree of illumination in a specific area around the vehicle, there may be certain areas around the vehicle which may not be illuminated by conventional vehicle lights. For instance, since headlights are typically disposed adjacent the sides of the vehicle, the area immediately in front and center of the vehicle may not be in the illumination path of conventional headlights. A dimly illuminated area in front of a vehicle may create a difficult or dangerous driving condition, particularly for vehicles driving off-road, as vegetation or other obstacles may be in the path of the vehicle. However, there may be difficulties associated with mounting lights in the front-center of an off-road vehicle, as branches or other vegetation may contact the lights as the vehicle moves through the vegetation, which may cause damage to such lights.

Accordingly, there is a need in the art for a light bar that can be selectively deployed to provide illumination in an area near a vehicle when needed, but can also conceal the light bar when not needed to provide protection to the light bar. Various aspects of the present disclosure address this particular need, as will be discussed in more detail below.

BRIEF SUMMARY

According to various aspects of the present disclosure, there is provided a light that may be integrated into the bumper on a vehicle. The light may be selectively actuated to illuminate the area in front of the bumper. The light may pivot between an open deployed (ON) position, and a closed stowed (OFF) position.

In one embodiment, there is provided a bumper for use on a vehicle. The bumper includes a main body having a central opening formed therein. The bumper additionally includes a pivoting assembly pivotally connected to the main body. The pivoting assembly includes a light bar having a body and a plurality of lights coupled to the body, with the plurality of lights being configured to emit light along an emitting axis. The pivoting assembly additionally includes a cover plate coupled to the body of the light bar. The pivoting assembly is configured to transition between a closed position and an open position. In the closed position, the cover plate extends within the central opening and the light bar is positioned so that the emitting axis does not extend through the central opening. In the open position, the cover plate being spaced from the central opening and the light bar is positioned so that the emitting axis extends through the central opening.

The bumper may also include an actuator connected to the main body and the pivoting assembly. The actuator may be pivotable relative to the main body to drive the pivoting assembly between the closed position and the open position. The actuator may include a main housing and a distal rod. The main housing may be pivotable relative to the main body and the distal rod may be translatable relative to the main housing.

The main body of the bumper may include a recess extending inwardly from an outer plane, and the central opening may be located within the recess. The main body may include an upper surface and a lower surface extending from opposite sides of the central opening, and both the upper and lower surfaces may be angled relative to the central opening.

The cover plate may be complementary in size and shape to the central opening.

The bumper may include a vent formed in the main body, with the vent including a plurality of vent openings.

The bumper may also include at least one mounting arm coupled to the main body, with the mounting arm being connectable to the vehicle.

The light bar may include a forward edge, and the cover plate may extend beyond the forward edge.

According to another embodiment, the bumper includes a main body having an opening formed therein, and a light assembly moveably connected to the main body. The light assembly includes a plate and a plurality of lights coupled to the plate and configured to emit light along an emitting axis. The light assembly is configured to transition between a closed position and an open position. In the closed position, the plate extends within the opening and the plurality of lights are positioned so that the emitting axis does not extend through the opening, and in the open position, the plate being spaced from the opening and the plurality of lights being positioned so that the emitting axis extends through the opening.

According to another embodiment, there is provided a method of assembling a bumper for use on a vehicle. The method includes connecting a light assembly to a main body.

The method may also include the step of connecting an actuator to the main body and the light assembly.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
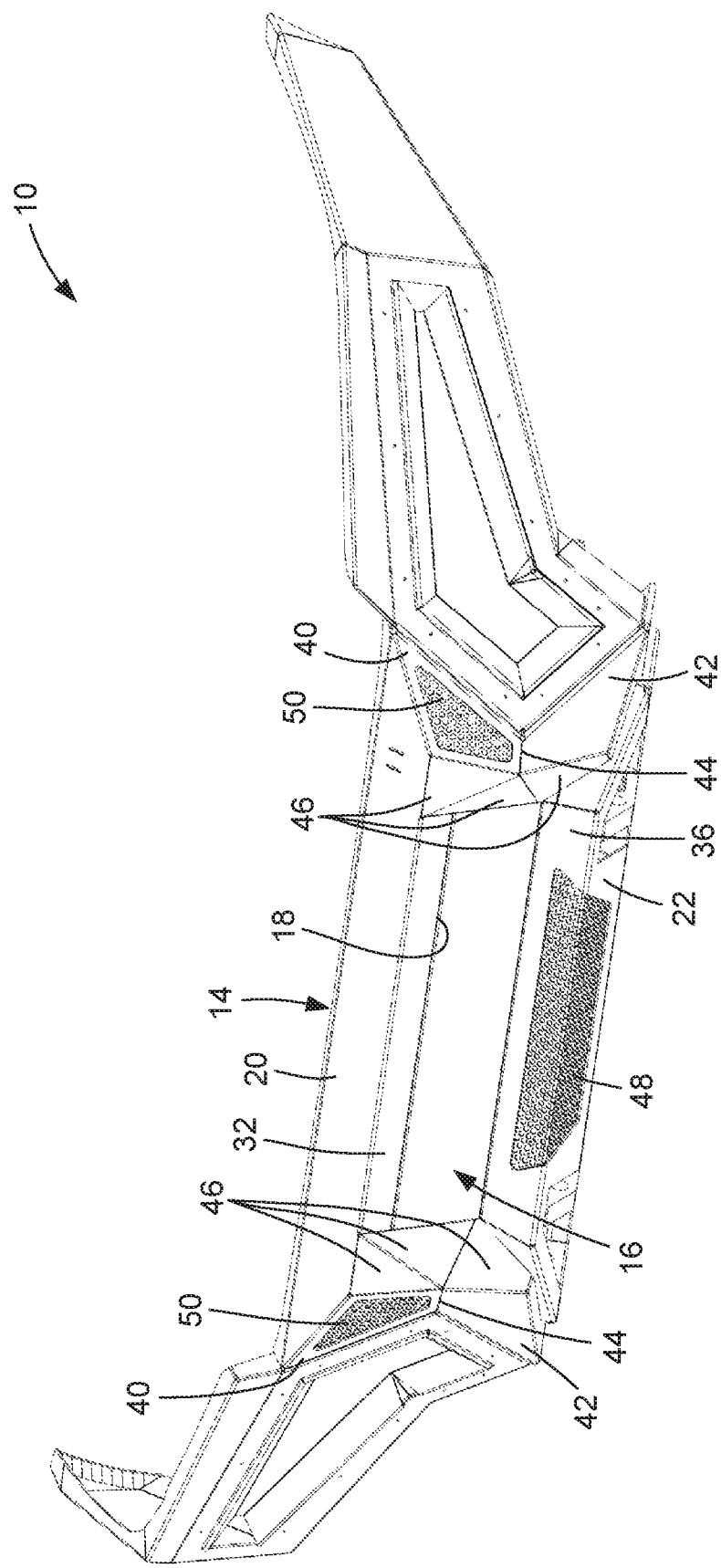
FIG. 1 is an upper perspective view of a vehicle bumper having an integrated light bar, with the light bar being in a closed position relative to a bumper body.
Figure 2:
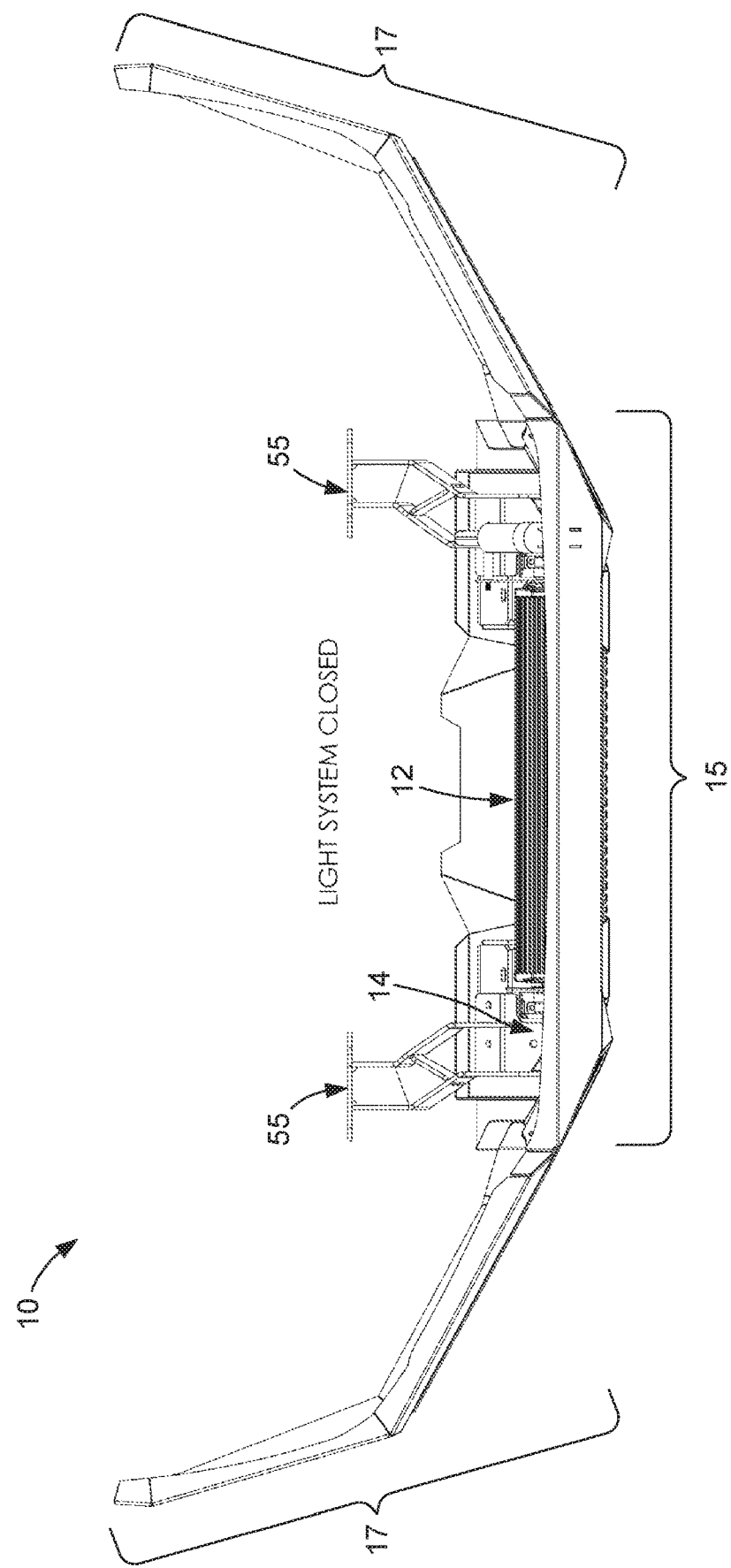
FIG. 2 is a top view of a bumper depicted in FIG. 1.

Referring now to the drawings, wherein the showings are for purposes of illustrating a preferred embodiment of the present disclosure, and are not for purposes of liming the same, there is depicted a bumper 10 for a vehicle. The bumper 10 includes an integrated light bar 12 that can be selectively transitioned between an open (ON) position, and a closed (OFF) position. The light bar 12 may pivot relative to a main body 14 of the bumper 10 as the light bar 12 transitions between the open and closed positions. The light bar 12 may be attached to a cover plate 16, such that when the light bar 12 is in the closed position, the cover plate 16 may be substantially coplanar with an adjacent outer surface of the main body 14 of the bumper 10, with the light bar 12 residing behind the cover plate 16, and thus, concealed from an external vantagepoint. However, as the light bar 12 transitions from the closed position toward the open position, the cover plate 16 may pivot with the light bar 12, such that the cover plate 16 is moved behind the external surface of the main body 14 of the bumper 10, and the light bar 12 is aligned with an opening 18 formed in the main body 14 to allow the light to be directed in front of the bumper 10. By integrating the light bar 12 into the bumper 10, the light bar 12 may be mounted to a more secure portion of the vehicle, and thus, protected from damage, such as overgrowth of vegetation on off-road trails.

Referring now specifically to FIGS. 1-5, the bumper 10 is shown in the closed position, with the bumper 10 including a main body 14 having a central portion 15, and a pair of opposed lateral arms 17 extending in opposite directions from the central portion 15, and extending in a slightly rearward direction so as to wrap around the front of a vehicle. According to one embodiment, the central portion 15 of the bumper 10 may be specifically contoured to create a desired aesthetic look, while also creating a cavity or recess within which the light bar 12 may be positioned for protection. Along these lines, the central portion 15 may include an upper inclined surface 20 and a lower inclined surface 22. The upper inclined surface 20 defines an upper forward edge 24 and the lower inclined surface 22 defines a lower forward edge 26. The upper forward edge 24 defines a first vertical plane 28 and the lower forward edge 26 defines a second vertical plane 30.

A front surface 32 extends from the upper inclined surface 20 and terminates at a front surface edge 34. An intermediate surface 36 extends from the lower inclined surface 22 and defines an intermediate surface edge 38, which is spaced from the front surface edge 34 to define the central opening 18 therebetween. The central opening 18 may be recessed behind the first and second vertical planes 28, 30 to provide protection to the light bar 12.

The central portion 15 may include a pair of sides, with each side protruding forwardly from the central opening 18. In the exemplary embodiment, each side includes an upper side surface 40 extending from the upper inclined surface 20. A lower side surface 42 extends from the upper side surface 40 at an angle such that the upper and lower side surfaces 40, 42 define an apex 44 therebetween. A plurality of side walls 46 may extend from the upper and lower side surfaces 40, 42 toward the front surface 32 and the intermediate surface 36. The side walls 46 may be angled relative to each other to create a desired aesthetic appeal.

The central portion 15 may include one or more air vents to facilitate air flow through the bumper 10. In the exemplary embodiment, a lower air vent 48 is formed in portions of the intermediate surface 38 and the lower inclined surface 22. Furthermore, each upper side surface 40 may include an upper air vent 50 formed therein. The location and configuration of the air vents 48, 50 depicted in the Figures is exemplary. Along these lines, it is contemplated that air vents may be formed in different locations and may be sized and shaped to be different from the exemplary air vents depicted in the Figures.

The main body 14 of the bumper 10 may additionally include one or more mounting arms 55 for mounting the bumper 10 to the chassis or other mounting structure on the vehicle. The mounting arms 55 may extend rearwardly from respective end regions of the central portion 15.

The specific configuration of the main body 14 described above and illustrated in the Figures is for purposes of illustrating one exemplary embodiment, and is not intended to the limit the scope of the present disclosure. In this regard, other configurations of the main body 14 are contemplated. In this respect, the main body 14 may broadly refer to any structure which may be used to mount the light bar 12 (or other lighting apparatus) to the vehicle.

Figure 6:
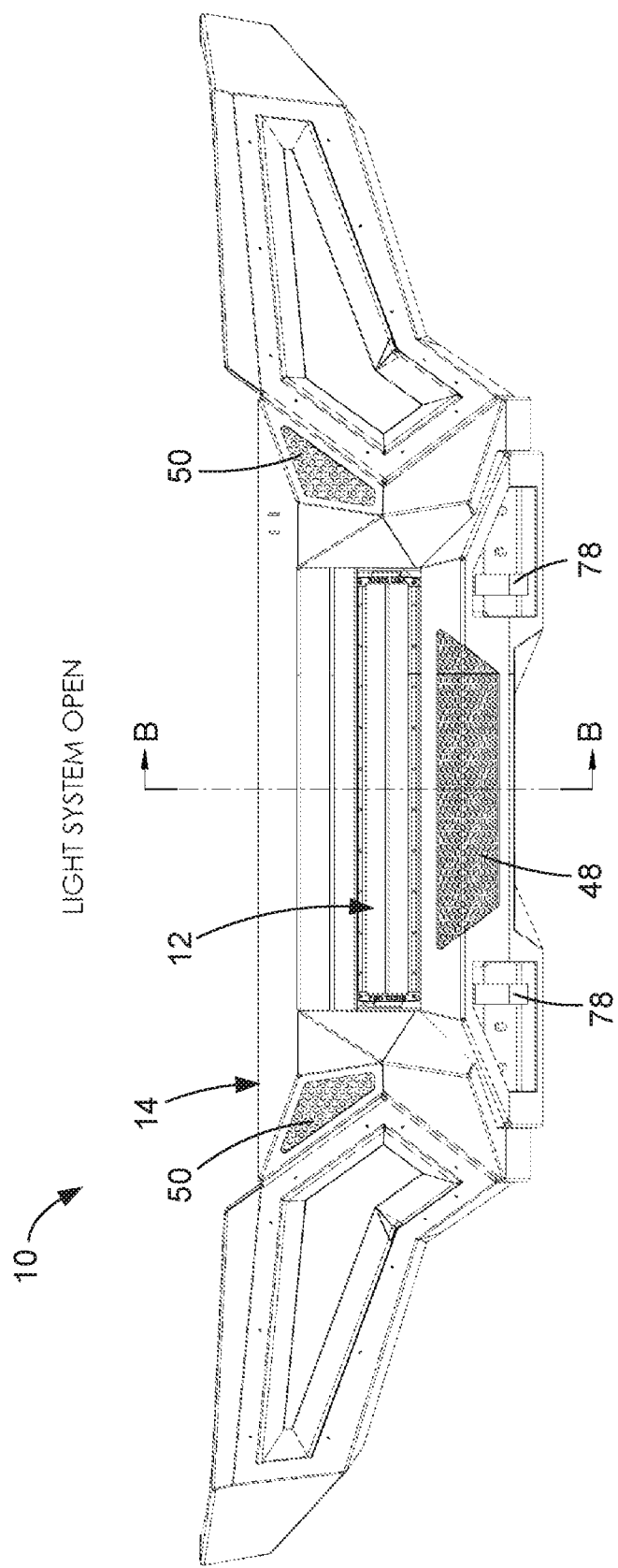
FIG. 6 is a front view of the bumper with the light bar being in an open position
Figure 7:
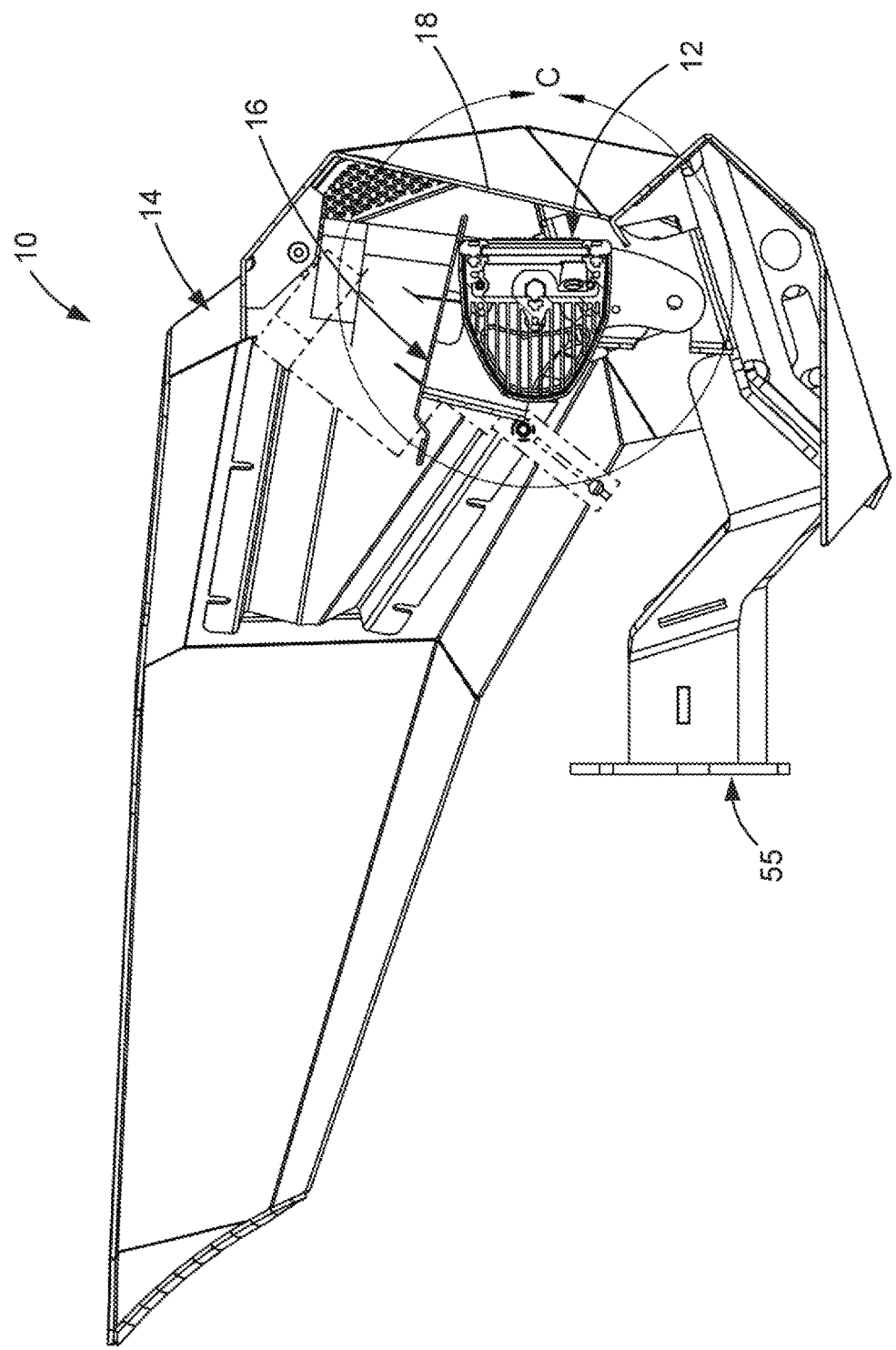
FIG. 7 is a cross sectional view taken along line B-B depicted in FIG. 6.
Figure 8:
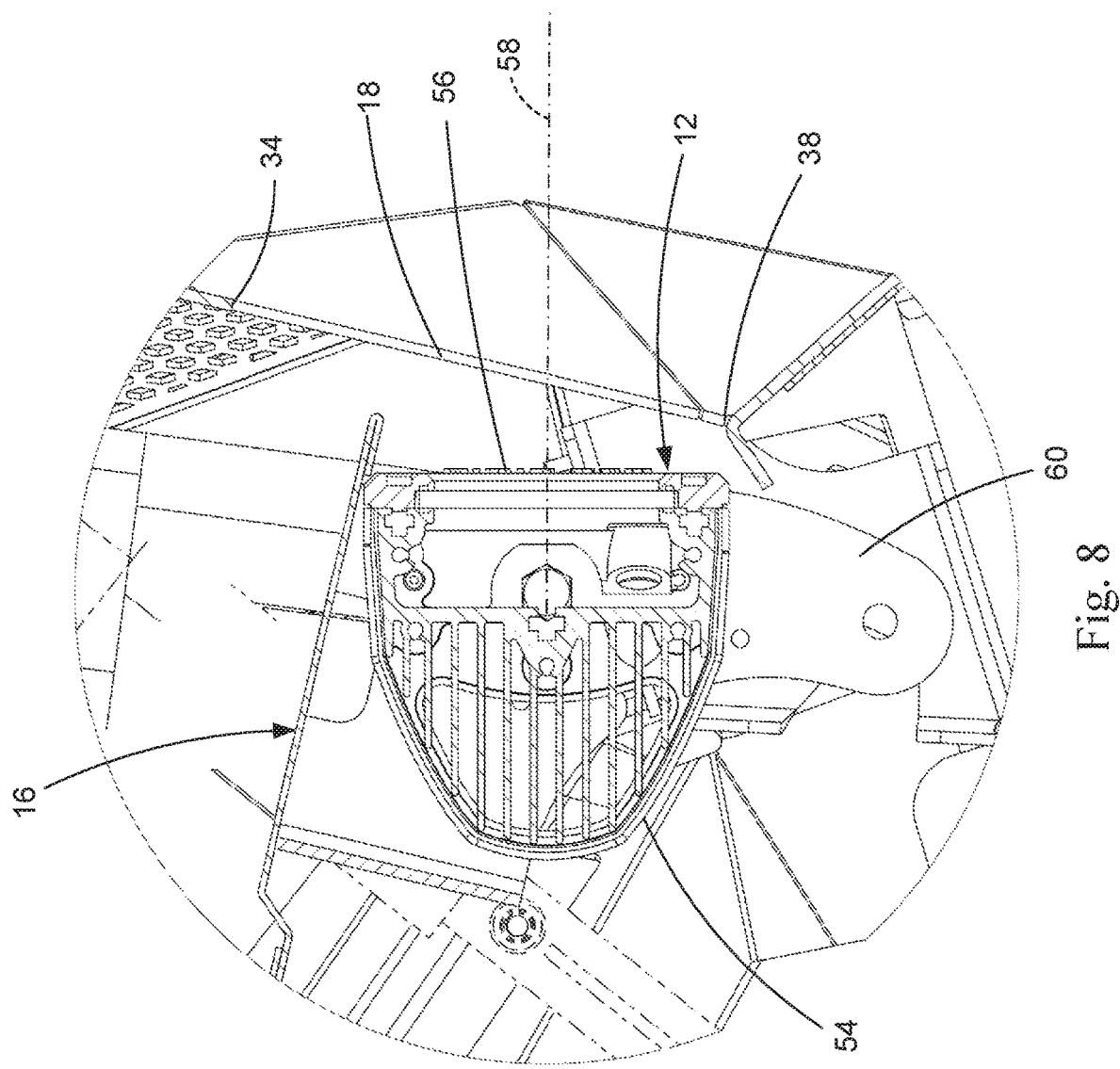
FIG. 8 is an enlarged view of that portion of FIG. 7 located within boundary line C shown in FIG. 7.
Figure 9:
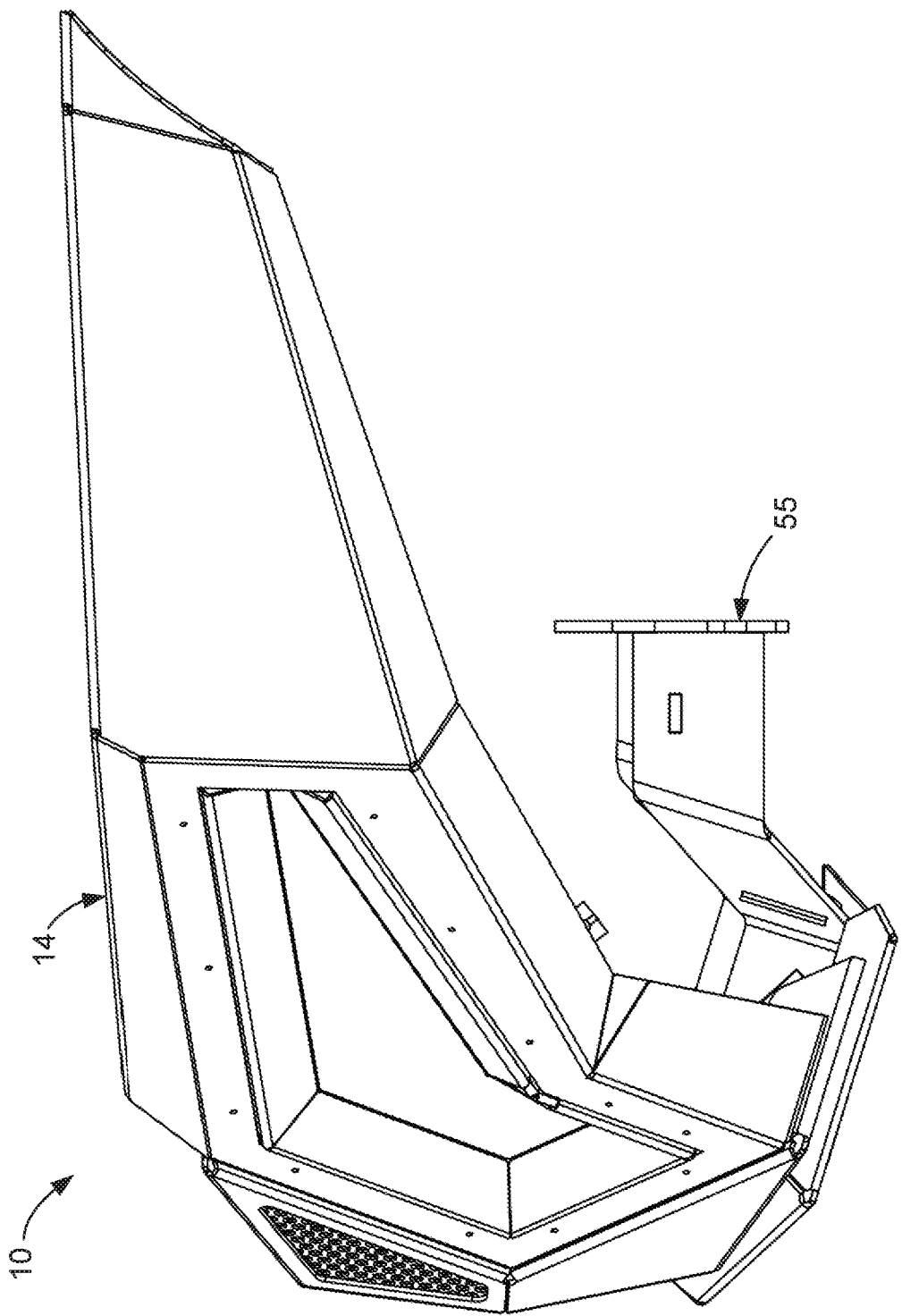
FIG. 9 is a side view of the bumper depicted in FIG. 5.
Figure 10:
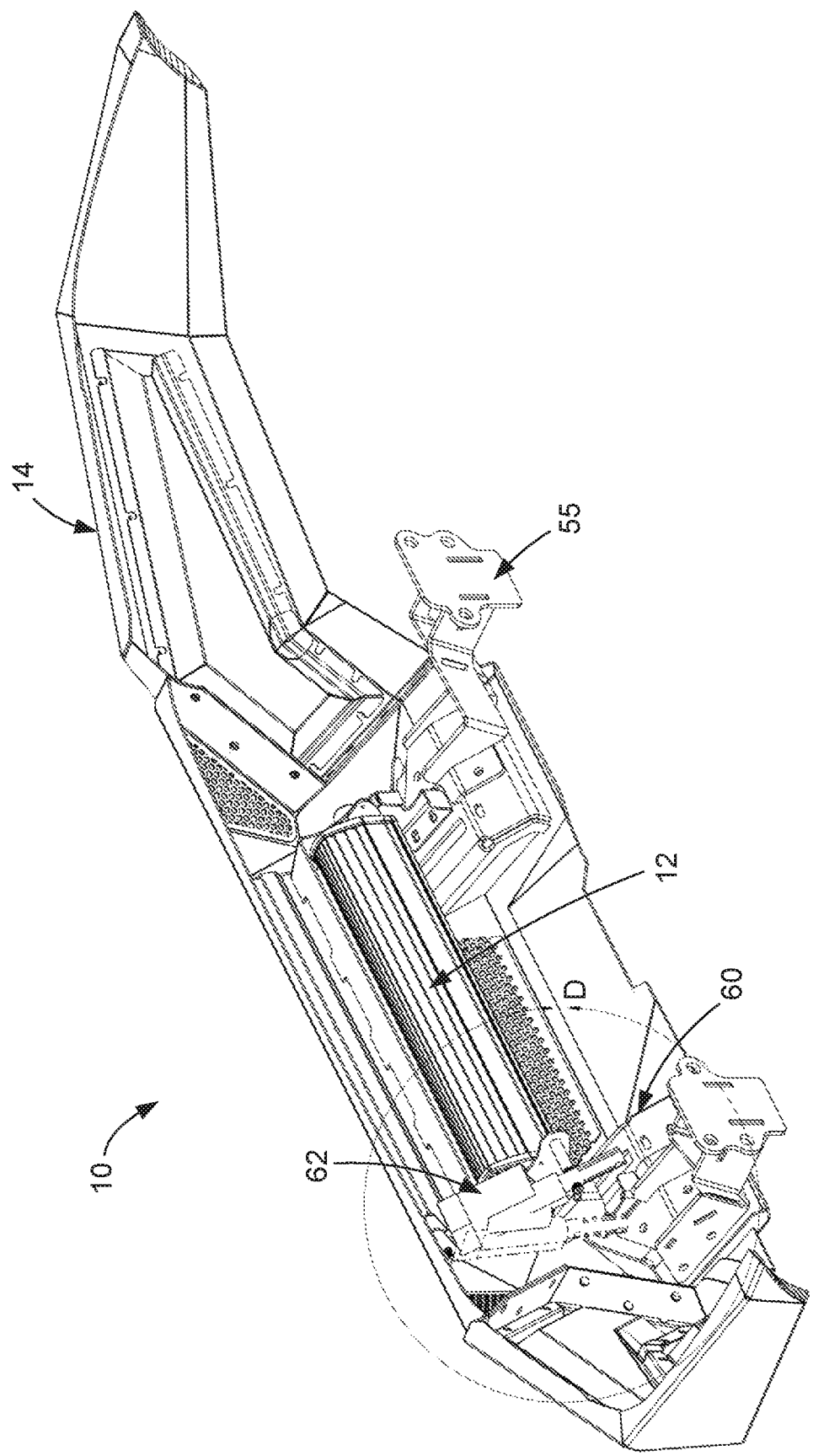
FIG. 10 is a rear upper perspective view of the bumper depicting transition of an actuator as the light bar moves between the closed and open positions.

The bumper 10 may additionally include a pivoting assembly 52 (e.g., light assembly) coupled to the main body 14 and including the light bar 12 and the cover plate 16 rigidly coupled to the light bar 12. The pivoting assembly 52 and pivotable relative to the main body 14 between two operative positions, e.g., a closed position and an open position. FIGS. 1-4 show the pivoting assembly 52 in the closed position, while FIGS. 6-8 show the pivoting assembly 52 in the open position. In the closed position, the pivoting assembly 52 is positioned such that the cover plate 16 extends within the central opening 18 to substantially cover or occupy the central opening 18, and thus, to conceal the light bar 12. In the open position, the pivoting assembly 52 is positioned such that the cover plate 16 is moved out of the central opening 18 and the light bar 12 is aligned with the central opening 18 to allow the light emitted from the light bar 12 to pass through the central opening 18.

Figure 4:
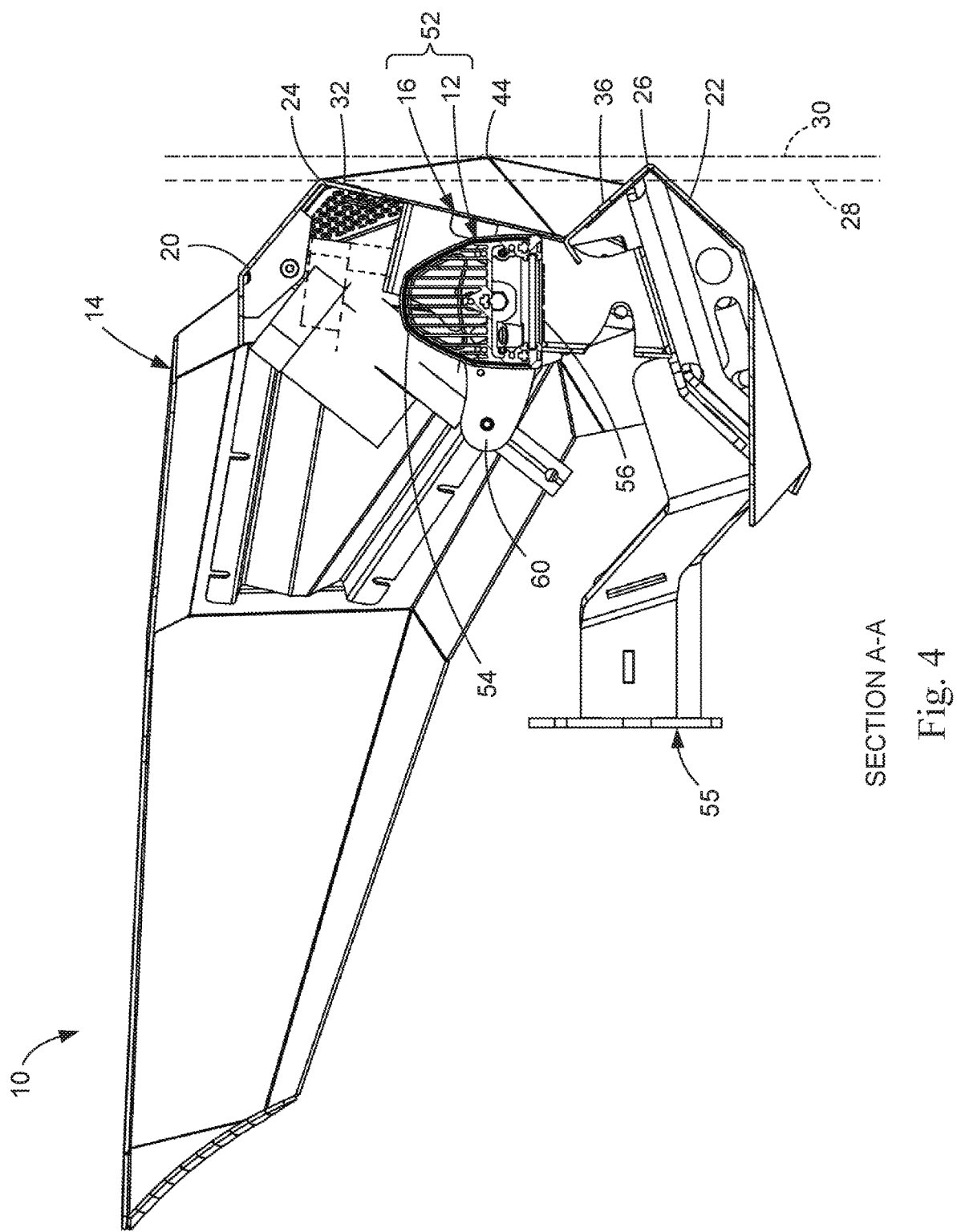
FIG. 4 is a cross sectional view taken along line A-A depicted in FIG. 3.
Figure 5:
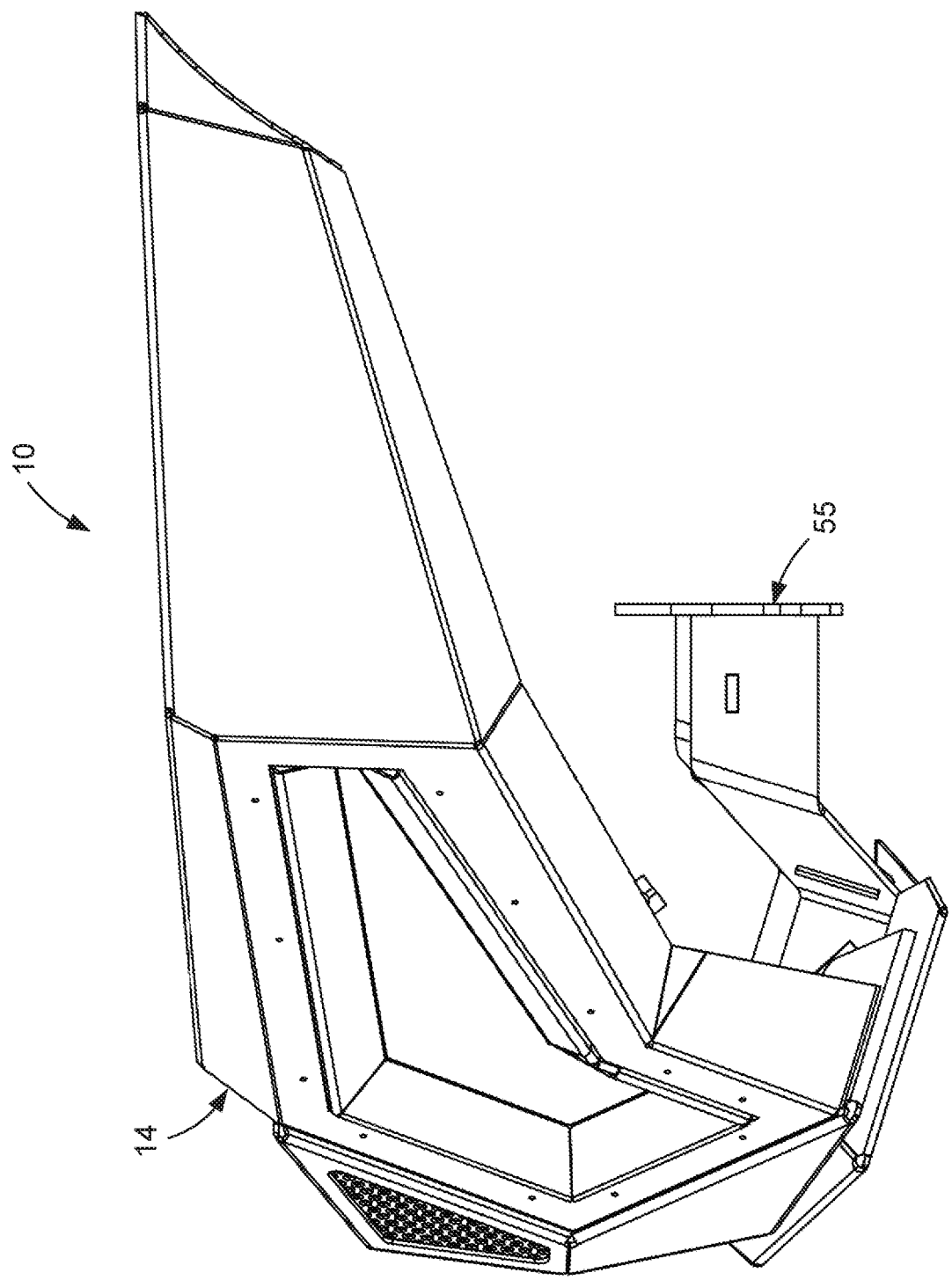
FIG. 5 is a side view of the bumper depicted in FIG. 1.

Referring now specifically to the cross-sectional view depicted in FIG. 4, the light bar 12 includes a body 54 and one or more lights 56 coupled to the body 54 and configured to emit light along an emitting axis (see FIG. 8). The lights 56 may be operatively connected to a power supply, such as the vehicle's power bus via a hardwire connection, or alternatively, the light bar 12 may include a local power supply, such as a battery.

Although the exemplary embodiments shows the lights 56 as being incorporated into a light bar 12, it is contemplated that in other embodiments, the lights 56 may be mounted directly to the cover plate 16, and thus, in such embodiments, a light bar 12 may not be included.

Figure 3:
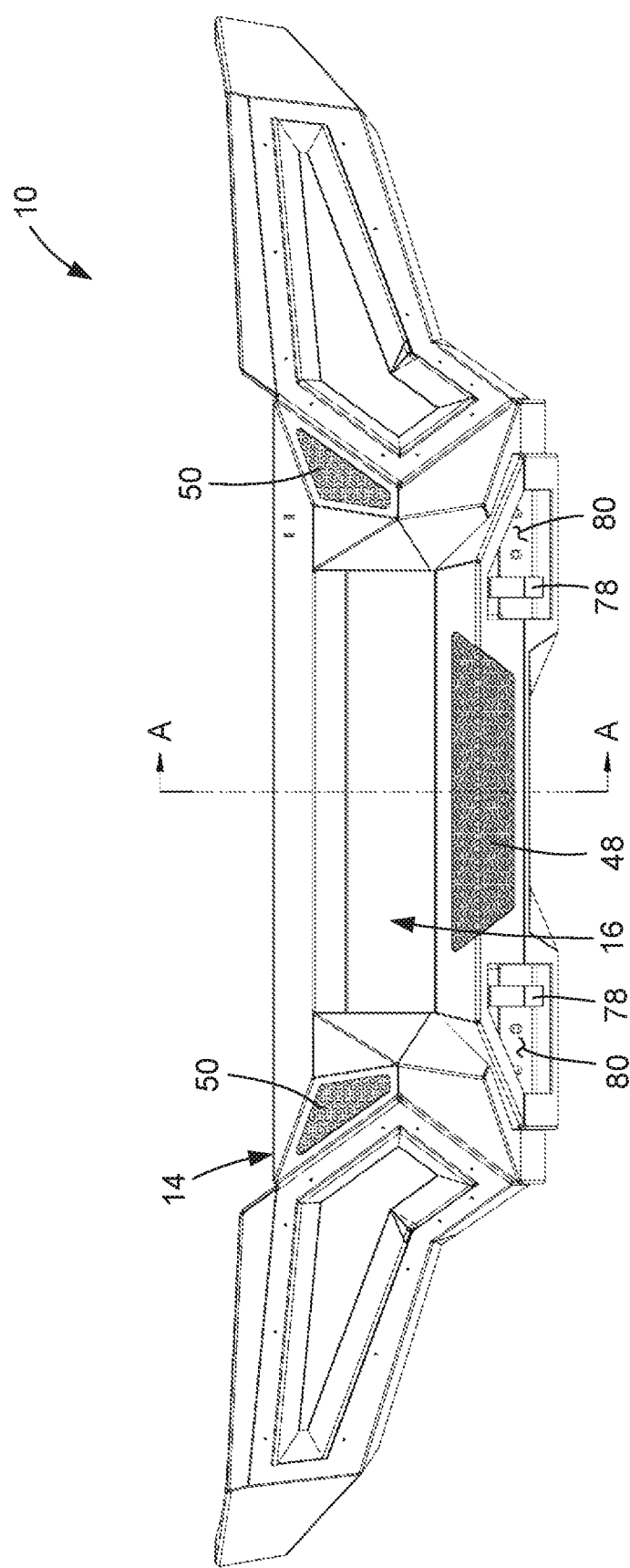
FIG. 3 is a front view of the bumper depicted in FIG. 1.

The cover plate 16 may be coupled to the body 54 so as not to intersect with the emitting axis 58, e.g., so that the cover plate 16 does not substantially block the light emitted by the lights 56. In one embodiment, the cover plate 16 is coupled to the body 54 so as to extend on top of the body 54 when the light bar 12 is in the open position. A portion of the cover plate 16 may protrude beyond the light bar 12 to serve as a water cover to aid in shielding the light bar 12 from water. As can be seen in FIGS. 1 and 3, the cover plate 16 is sized and to be complementary to the size and configuration of the central opening 18. In this regard, the cover plate 16 may occupy substantially all of the central opening 18 when the pivoting assembly 52 is in the closed position. In the exemplary embodiment, both the central opening 18 and the cover plate 16 are quadrangular in shape. The cover plate 16 may be formed of a material that is identical or similar to the material used to form the main body 14 of the bumper 10, e.g., metal or other materials known in the art. In this regard, the cover plate 16 may be configured to appear as a continuous portion of the main body 14 when the cover plate 16 is positioned within the central opening 18.

It is contemplated that the pivoting assembly 52 and main body 14 may be configured to allow for a certain degree of angular adjustability of the emitting axis 58 when the light bar 12 is in the open position. For instance, the pivoting assembly 52 may be mounted to the main body 14 such that the emitting axis 58 is slightly above a horizontal plane, at the horizontal plane, or slightly below the horizontal plane when the pivoting assembly 52 is in the open position.

According to one embodiment, the cover plate 16 and light bar 12 may be connected to a lever arm 60 which may be coupled to an actuator 62 to facilitate movement of the pivoting assembly 52 between the closed and open positions. In one embodiment, the light bar 12 may pivot approximately 90 degrees as the pivoting assembly 52 transitions between the closed and open positions. However, it is understood that the present disclosure is not limited to 90 degrees of pivotal motion, and that the light bar 12 may pivot from 30-330 degrees without departing from the spirit and scope of the present disclosure. Furthermore, in another embodiment, the light bar 12 or lights 56 may remain stationary relative to the main body 14, and the cover plate 16 may move relative to the light bar 12 or lights 56 to effectuate covering (e.g., closed) and uncovering (e.g., open) the light bar 12 or lights 56.

Figure 11:
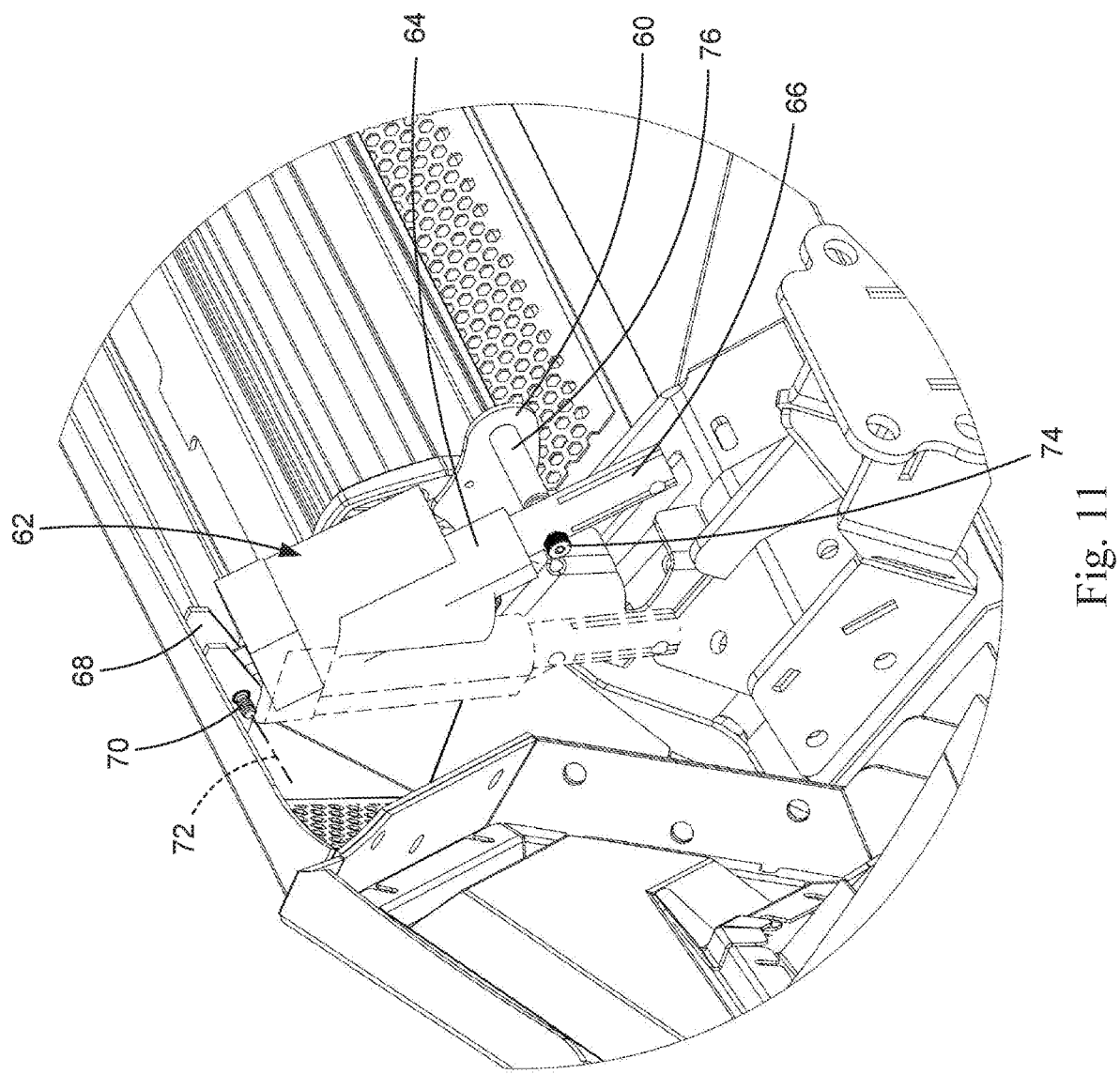
FIG. 11 is an enlarged view of that portion of FIG. 10 located within boundary line D shown in FIG. 10.
Figure 12:
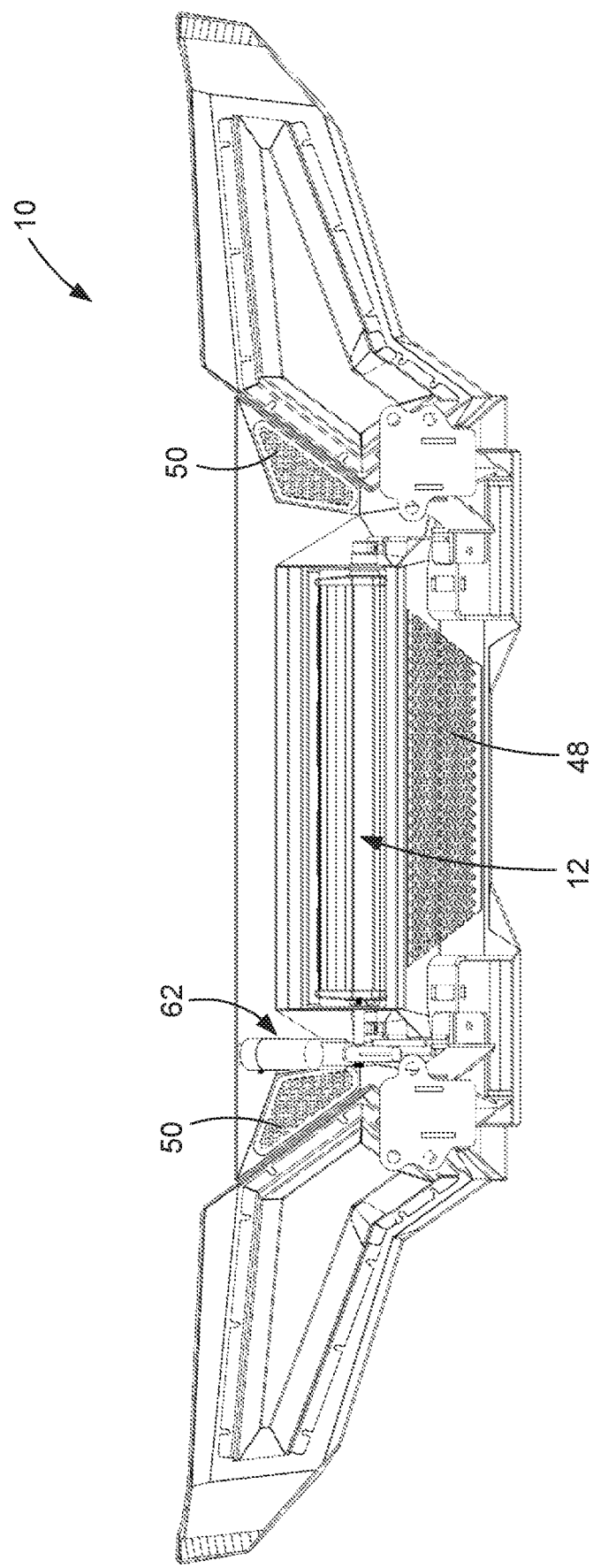
FIG. 12 is a rear view of the bumper.

Referring now specifically to FIG. 11, there is depicted an enlarged partial view showing one embodiment of the actuator 62. The actuator 62 may be coupled to the main body 14 of the bumper 10 and may move relative to the main body 14 of the bumper 10 to cause the pivoting assembly 52 to transition between the closed and open positions. The actuator 62, as depicted in the Figures, is shown in two positions, namely, a first position associated with the pivoting assembly 52 being closed, and a second position (in phantom), associated with the pivoting assembly 52 being opened.

According to one embodiment, the actuator 62 includes a main housing 64 and a distal piston or rod 66 coupled to the main housing 64. The main housing 64 includes an upper end that is pivotally coupled to the main body 14 of the bumper 10. Along these lines, the bumper 10 may include a bracket 68 and a pivot pin 70 may be used to attach the main housing 64 to the bracket 68, with the pivot pin 70 defining an axis 72 about which the main housing 64 may pivot relative to the main body 14 of the bumper 10. The distal rod 66 may be translatable relative to the main housing 64, such that the amount of the distal rod 66 protruding out from the main housing 64 may vary as the actuator 62 transitions between the first and second positions. In one particular embodiment, the distal rod 66 moves by about two inches as the actuator 62 transitions between the first and second positions, although, depending on the size of the bumper 10 and the pivoting assembly 52, as well as the configuration of the actuator 62, the magnitude by which the distal rod 66 translates relative to the main housing 64 may vary.

The distal rod 66 may be connected to the lever arm 60 via a pivot pin 74 housed within a pivot pin bushing 76. The pivotal and translatable movement of the distal rod 66 may drive the lever arm 60 to transition the pivoting assembly 52 between the closed and open positions.

The actuator 62 may be a hydraulic actuator, pneumatic actuator, an electric linear actuator such as a step or screw actuator, or any other actuator known in the art.

With the basic structure of the bumper 10 described above, the following discussion is an exemplary use of the bumper 10. A driver may drive the vehicle with the pivoting assembly 52 in the closed configuration. In this regard, the cover plate 16 may be placed within the central opening 18, and the bumper 10 may function similar to a conventional bumper 10. When the pivoting assembly 52 is in the closed position, the actuator 62 may be in its first position.

If the user wants to actuate the light, the user may send a signal to the actuator 62, such as via a control button or switch to, instruct the actuator 62 to move from its first position to its second position. In this regard, the actuator 62 may be in operative communication with a button or switch mounted near the dashboard of the vehicle, in which case, the actuator may be hardwired to the button/switch, or in wireless communication with the button/switch. It is also contemplated that the actuator may be operatively connectable to a user's smartphone to allow for control of the actuator via the smartphone, such as via Bluetooth™, WiFi™, or other short-range wireless communication methods.

In more detail, as the actuator 62 moves from the first position to the second position, the main housing 64 of the actuator 62 pivots relative to the main body 14 of the bumper 10 in a first pivotal direction. In addition, the distal rod 66 of the actuator 62 may retract into the main housing 64. The combined pivotal movement of the main housing 64 and retraction of the distal rod 66 drives the lever arm 60 away from the central opening 18. In the embodiment depicted in the drawings, the lever arm 60 moves approximately ninety degrees from an orientation wherein the lever arm 60 is extending generally downwardly, to an orientation wherein the lever arm 60 is extending generally rearwardly. This motion of the lever arm 60 causes the pivoting assembly 52 to pivot approximately ninety degrees about a central pivot axis to bring the light bar 12 into alignment with the central opening 18, and to raise the cover panel out of the central opening 18. In this regard, when the light bar 12 is moved into alignment with the central opening 18, the emitting axis extends through the central opening 18.

The light bar 12 may be configured to automatically actuate when the pivoting assembly 52 is in the open position, or alternatively, illumination of the light bar 12 may be separately controlled by the user. The light illuminated by the light bar 12 may assist in illuminating objects or terrain in front of the vehicle. Furthermore, the position of the light bar 12 as being spaced from a forward plane of the bumper 10 may provide protection to the light bar 12.

The pivoting assembly 52 may remain in the open position, until such time that the user desires to transition the pivoting assembly 52 to the closed position. The user may send a signal to the actuator 62 to instruct the actuator 62 to move from its second position to its first position. In more detail, as the actuator 62 moves from the second position to the first position, the main housing 64 of the actuator 62 pivots relative to the main body 14 of the bumper 10 in a second pivotal direction. In addition, the distal rod 66 of the actuator 62 may extend from the main housing 64. The combined pivotal movement of the main housing 64 and the extension of the distal rod 66 may drive the lever arm 60 toward the central opening 18. In the embodiment depicted in the drawings, the lever arm 60 moves approximately ninety degrees from an orientation wherein the lever arm 60 is extending generally rearwardly, to an orientation wherein the lever arm 60 is extending generally downwardly. This motion of the lever arm 60 causes the pivoting assembly 52 to pivot approximately ninety degrees about the central pivot axis to move the light bar 12 out of alignment with the central opening 18, and to lower the cover panel so as to substantially occupy the central opening 18. When the light bar 12 is out of alignment with the central opening 18, the emitting axis may not extend through the central opening 18. In the exemplary embodiment, the emitting axis extends downwardly when the pivoting assembly 52 is closed.

In addition to the light bar 12, the bumper 10 may have additional features which may enhance the overall functionality thereof. In one embodiment, and referring now specifically to FIG. 3, the bumper 10 may include a pair of tow hooks 78 that are positioned relative to the main body 14 such that no portion of the tow hooks 78 protrude beyond a forward-most vertical plane defined by the main body 14. In particular, each tow hook 78 may be located within a respective cavity 80 formed on the bumper 10. Each cavity 80 may include a forward opening so as to allow for access to the tow hook 78.

It is contemplated that the bumper 10 discussed herein may be a front bumper or a rear bumper. In this regard, the light provided by the bumper 10 may illuminate an area in front of the vehicle or behind the vehicle.

It is contemplated that transition of the pivoting assembly 52 between the closed and open positions may occur autonomously based on predetermined operational conditions of the vehicle. For instance, the pivoting assembly 52 may pivot to the open position when the onboard, OEM lights actuate, and pivot to the closed position when the onboard OEM lights turn off. Furthermore, in the case of the bumper 10 being positioned on the rear of the vehicle, the pivoting assembly 52 may pivot to the open position when the vehicle is placed in reverse, and pivot to the closed position when the vehicle is placed in drive.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A bumper for use on a vehicle, the bumper comprising:
a main body having a central opening formed therein; and
a pivoting assembly pivotally connected to the main body, the pivoting assembly comprising:
a light bar having a body and a plurality of lights coupled to the body, the plurality of lights configured to emit light along an emitting axis; and
a cover plate coupled to the body of the light bar;
the pivoting assembly being configured to transition between a closed position and an open position, in the closed position, the cover plate extending within the central opening and the light bar being positioned so that the emitting axis does not extend through the central opening, in the open position, the cover plate being spaced from the central opening and the light bar being positioned so that the emitting axis extends through the central opening.

2. The bumper recited in claim 1, further comprising an actuator connected to the main body and the pivoting assembly, the actuator being pivotable relative to the main body to drive the pivoting assembly between the closed position and the open position.

3. The bumper recited in claim 2, wherein the actuator includes a main housing and a distal rod, the main housing being pivotable relative to the main body and the distal rod being translatable relative to the main housing.

4. The bumper recited in claim 1, wherein the main body includes a recess extending inwardly from an outer plane, the central opening being located within the recess.

5. The bumper recited in claim 1, wherein the main body includes an upper surface and a lower surface extending from opposite sides of the central opening, both the upper and lower surfaces being angled relative to the central opening.

6. The bumper recited in claim 1, wherein the cover plate is complementary in size and shape to the central opening.

7. The bumper recited in claim 1, further comprising a vent formed in the main body, the vent including a plurality of vent openings.

8. The bumper recited in claim 1, further comprising at least one mounting arm coupled to the main body and being connectable to the vehicle.

9. The bumper recited in claim 1, wherein the light bar includes a forward edge, the cover plate extending beyond the forward edge.

10. A bumper for use on a vehicle, the bumper comprising:
a main body having an opening formed therein; and
a light assembly moveably connected to the main body, the light assembly comprising:
a plate; and
a plurality of lights coupled to the plate and configured to emit light along an emitting axis;
the light assembly being configured to transition between a closed position and an open position, in the closed position, the plate extending within the opening and the plurality of lights being positioned so that the emitting axis does not extend through the opening, in the open position, the plate being spaced from the opening and the plurality of lights being positioned so that the emitting axis extends through the opening.

11. The bumper recited in claim 10, further comprising an actuator connected to the main body and the light assembly, the actuator being pivotable relative to the main body to drive the light assembly between the closed position and the open position.

12. The bumper recited in claim 11, wherein the actuator includes a main housing and a distal rod, the main housing being pivotable relative to the main body and the distal rod being translatable relative to the main housing.

13. The bumper recited in claim 10, wherein the main body includes a recess extending inwardly from an outer plane, the opening of the main body being located within the recess.

14. The bumper recited in claim 10, wherein the main body includes an upper surface and a lower surface extending from opposite sides of the opening, both the upper and lower surfaces being angled relative to the opening of the main body.

15. The bumper recited in claim 10, wherein the plate is complementary in size and shape to the opening in the main body.

16. The bumper recited in claim 10, further comprising a vent formed in the bumper, the vent including a plurality of vent openings.

17. The bumper recited in claim 10, further comprising at least one mounting arm coupled to the main body and being connectable to the vehicle.

18. The bumper recited in claim 10, wherein the light bar includes a forward edge, the cover plate extending beyond the forward edge.

19. A method of assembling a bumper for use on a vehicle, the method comprising:
   connecting a main body having a central opening formed therein
   to a pivoting assembly pivotally connected to the main body, the pivoting assembly comprising:
      a light bar having a body and a plurality of lights coupled to the body, the plurality of lights configured to emit light along an emitting axis; and
      a cover plate coupled to the body of the light bar;
   the pivoting assembly being configured to transition between a closed position and an open position, in the closed position, the cover plate extending within the central opening and the light bar being positioned so that the emitting axis does not extend through the central opening, in the open position, the cover plate being spaced from the central opening and the light bar being positioned so that the emitting axis extends through the central opening.

20. The method recited in claim 19, further comprising the step of connecting an actuator to the main body and the pivoting assembly, the actuator being pivotable relative to the main body to drive the pivoting assembly between the closed position and the open position.

* * * * *